United States Patent

[15] 3,656,300

Wikdahl

[45] Apr. 18, 1972

[54] METHOD OF CONVERTING NUCLEAR ENERGY TO MECHANICAL ENERGY AND INSTALLATION FOR CARRYING OUT THE METHOD

[72] Inventor: Nils Anders Lennart Wikdahl, Bravallavagen 42, Djursholm, Sweden

[22] Filed: Oct. 11, 1968

[21] Appl. No.: 766,740

Related U.S. Application Data

[63] Continuation-in-part of Ser. No. 599,523, Dec. 6, 1966, abandoned.

[52] U.S. Cl. ..........................................60/59, 415/59, 415/64, 176/39, 60/203, 176/40
[51] Int. Cl. ..........................................F01k 27/00
[58] Field of Search ..................176/39, 60, DIG. 4, 58, 59, 176/28, 29; 60/203, 59 T

[56] References Cited

UNITED STATES PATENTS 3,047,483    7/1962    Polak...................................176/28
3,047,486    7/1962    Hanson.................................176/28

FOREIGN PATENTS OR APPLICATIONS 772,404    4/1957    Great Britain.........................176/28
855,155    11/1960    Great Britain.........................176/59

*Primary Examiner*—Reuben Epstein
*Attorney*—Hane & Baxley

[57] ABSTRACT

A method and an installation for converting nuclear energy to mechanical energy by incorporating fissionable material in at least some of the vanes defining a continuous tortuous duct in a turbine, directing a compressed fluid flow through said duct, extending this fluid flow in at least part of the duct to effect transfer of released nuclear energy to the fluid flow and directing the fluid flow upon the driving vanes of the turbine to effect rotation thereof thereby converting the released nuclear energy to mechanical energy.

14 Claims, 11 Drawing Figures

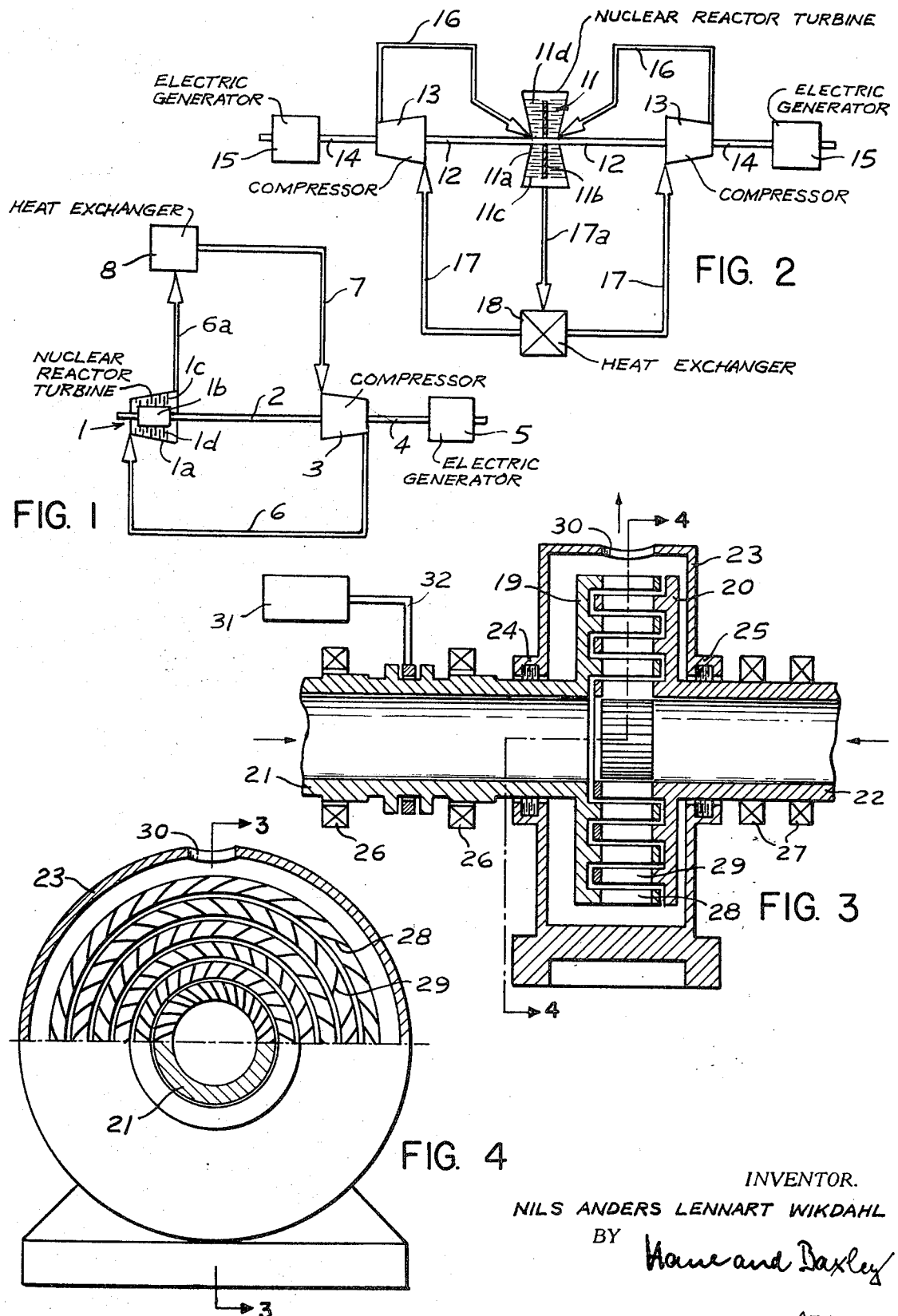

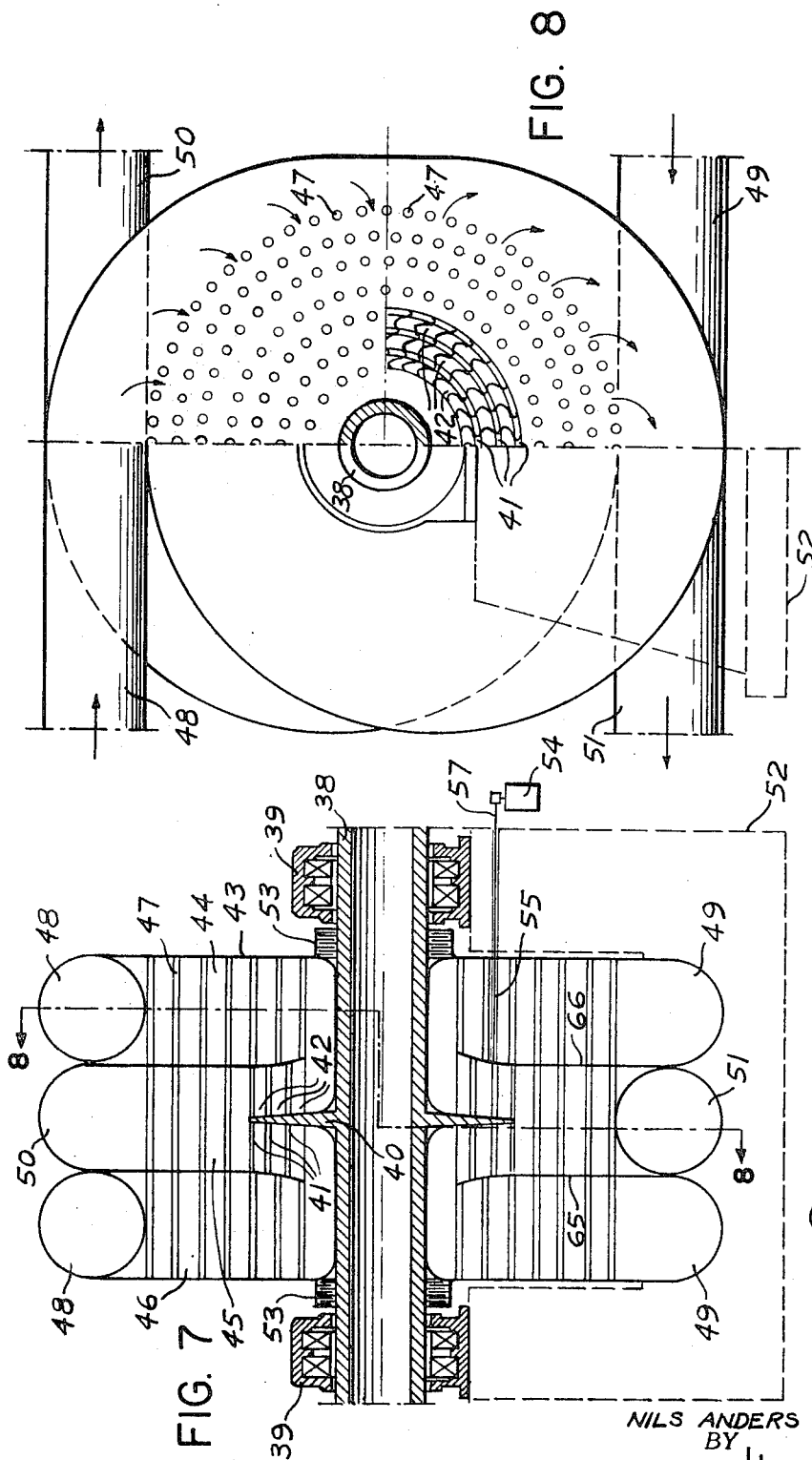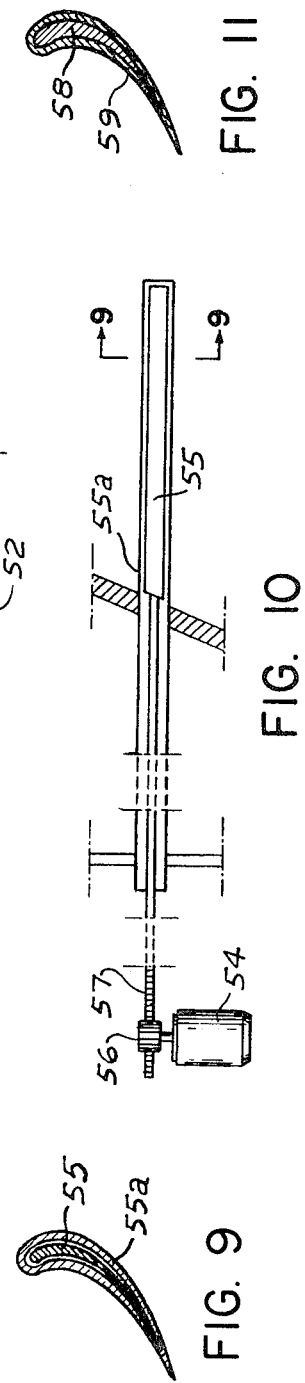

METHOD OF CONVERTING NUCLEAR ENERGY TO MECHANICAL ENERGY AND INSTALLATION FOR CARRYING OUT THE METHOD

CROSS-REFERENCE

The present application is a continuation-in-part application based on my copending application Ser. No. 599,523, filed Dec. 6, 1966 now abandoned.

The present invention relates to a method of converting nuclear energy generated in a nuclear reactor of the critical fast reactor type to mechanical or kinetic energy and also to an installation for carrying out the method of the invention.

BACKGROUND

It is known to feed thermal energy generated in a nuclear reactor of an atomic power plant via a fluid carried in pipe lines to external utilization equipment. In such equipment, the thermal energy is converted to mechanical or kinetic energy and may then be further converted to electrical energy.

THE INVENTION

It is a broad object of the invention to produce mechanical or kinetic energy directly in a nuclear reactor turbine of the critical fast reactor type. The turbine may be of the axial or the radial flow type, that is, a turbine with stationarily mounted guide vanes and rotary driving vanes in mesh with each other to define therebetween a duct for the gaseous fluid used for operating the turbine. The turbine may also be a double-rotation type turbine, that is, a turbine which has two oppositely rotating rotor halves. Each of the rotor halves mounts vanes which are intermeshing so that the vanes on each rotor half constitute driving vanes and guide vanes respectively for the other.

The aforementioned object, and other objects pointed out hereinafter, are obtained by causing the gaseous fluid used for operation of the nuclear reactor turbine to flow within the turbine through the continuous duct and past vanes in the walls of which a solid reactor fuel is incorporated. The fluid is fed into the duct under pressure and is expanded at least at portions of the duct to effect transfer of the nuclear energy released by the nuclear fuel incorporated in the vanes to the fluid. Such expansion of the fluid will be substantially isothermal. As is well known, the efficiency of isothermal expansion is far superior to the efficiency of an adiabatic expansion. The expanded fluid acts upon the driving vanes of the turbine to effect rotation thereof which in turn can be utilized for instance to drive an electric generator.

The release of nuclear energy can be accurately and conveniently controlled by incorporating the solid nuclear fuel in the vanes by means of rods which are retractable in a controlled fashion.

The flow losses in the duct of the turbine can be kept very low and a high flow velocity and hence a high transfer of energy can be readily maintained.

Other and further objects, features and advantages will be pointed out hereinafter and set forth in the appended claims constituting part of the application.

In the accompanying drawing, several preferred embodiments of the invention are shown by way of illustration and not by way of limitation.

In the drawing:

FIG. 1 is a diagrammatic view of an installation for converting nuclear energy to mechanical energy in accordance with the invention;

FIG. 2 is a diagram of a modified installation for effecting such conversion;

FIG. 3 is a diagrammatic sectional view, taken on line 3—3 of FIG. 4, of a nuclear reactor turbine for use in an installation according to the invention;

FIG. 4 is a sectional view taken on line 4—4 of FIG. 3;

FIG. 7 is a diagrammatic longitudinal sectional view of a modified nuclear reactor turbine for use in an installation according to the invention;

FIG. 8 shows in its left half an end view of FIG. 7 and in its right half a section taken on line 8—8 of FIG. 7;

FIG. 9 is a sectional detailed view of a vane incorporating nuclear fuel taken on line 9—9 of FIG. 10;

FIG. 10 is a diagrammatic view of a control device for varying the effective position of the nuclear fuel in the vane according to FIG. 9; and FIG. 11 is a sectional view of a modified vane in which nuclear fuel is incorporated in a fixed position.

Figure 5:
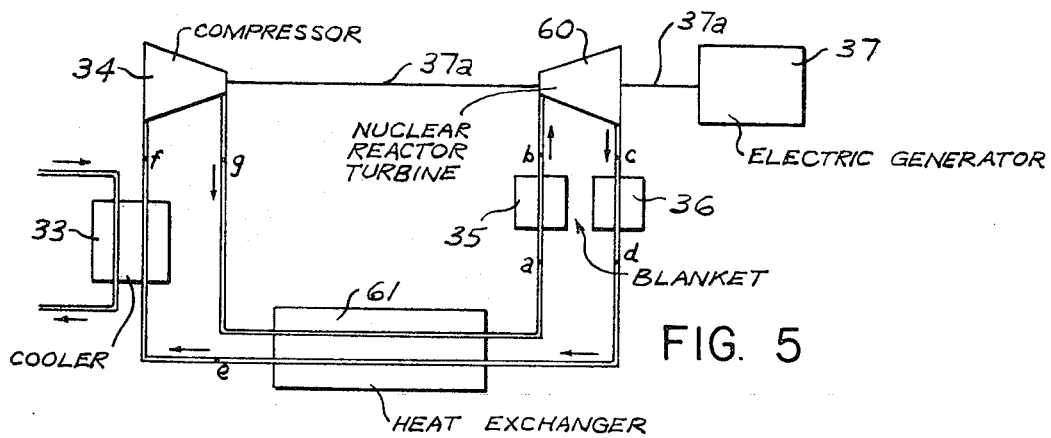
FIG. 5 is a diagram of another modification of an installation for converting nuclear energy to mechanical energy.

Referring first to FIG. 1, the installation exemplified in this figure comprises a turbine 1. This turbine should be visualized as a conventional axial-flow type turbine except for the specific features of the invention which will be pointed out hereinafter Accordingly, the turbine comprises a stationary housing 1a in which is rotatably mounted a rotor 1b. Guide vanes 1c extend from the housing radially inward in mesh with driving vanes 1d extending radially outward from the rotor to define a continuous tortuous duct between the vanes. The action fluid is fed under pressure into the turbine housing through a pipe 61 to an inlet at the left hand end of the housing and is discharged therefrom through an outlet at the right hand end of the housing to a pipe 6a.

In accordance with the invention, at least some of the vanes of the turbine, preferably at least some of the stationary guide vanes, have incorporated therein fissionable material such as enriched uranium ($U^{235}$) or plutonium (Pu). The nuclear fuel may either be fixedly encapsulated in the vanes or may be selectively retractable therefrom to control the efficiency thereof.

FIGS. 9 and 10 show a guide vane having incorporated therein nuclear fuel. The vane as illustrated has an outer jacket or shell 55a made of a suitable material such as titanium or beryllium in which a control rod 55 made at least partly of nuclear fuel is axially displaceable. Selective displacement of the rod may be effected by a rack 57 in engagement with a pinion 56 driven by a motor 54.

FIG. 11 shows a similar vane having a jacket 59 encapsulating a core 58 of nuclear fuel except that the fuel is in fixed position in the vane.

The action fluid may be steam, vapor, nitrogen or gaseous heavy water. The fluid is pressurized by means of a compressor 3 of conventional design. The outlet or pressure side of the compressor is connected by pipe 6 to the inlet of the turbine, as is indicated by arrowheads, that is, the fluid flow is in axial direction and from left to right.

The fluid is expanded within at least part of the turbine duct to transfer the nuclear energy released by the nuclear fuel in the turbine vanes to the fluid. Due to the transfer of energy, the expansion of the fluid will be substantially isothermal. The energy thus imparted to the fluid is utilized to rotate the rotor 1b of the turbine acting on the driving vanes thereof.

The nuclear reactor turbine is operated as a turbine of the critical fast reactor type. The concentration of nuclear fuel in the turbine may vary; for instance, a suitable value is 24 volume/percent. The exact calculation of the required critical mass in the turbine can be carried out in accordance with conventional reactor techniques, as described for instance in the publication "LARGE FAST REACTOR DESIGN STUDY, FINAL REPORT - ACNP-64503, Jan. 1964, Allis Chalmers, Atomic Energy Division."

The rotation of rotor 1b is utilized to drive compressor 3 via a transmission 2 and also an electric generator 5 via a transmission 4. The expanded fluid is returned to the compressor for recompression, as previously described.

Starting of the nuclear reactor turbine can be effected in a conventional manner by an electric motor, as is described for instance in British Pat. No. 855,155; pressurized air may also be used in the manner similar to the starting of a conventional gas turbine motor.

In some instances it is necessary or advisable to remove a smaller or larger percentage of the thermal energy from the installation. Such removal may be effected by a suitable and conventional, preferably adjustable, heat exchanger 8 included into the return path from the turbine to the compressor, as shown. The thermal energy thus obtained can be used for any suitable purposes such as heating, possibly in connection with distilling operations or generation of power.

FIG. 2 shows an installation similar in principle to FIG. 1, except that the nuclear reactor turbine is shown as a radial-flow turbine. Again the turbine should be visualized as being of conventional design, except for the inclusion of fissionable material or nuclear fuel in at least some of the vanes of the turbine. The turbine is diagrammatically shown as having a stationary, for instance Venturi shaped housing 11a in which a rotor 11b is journaled for rotation about its crosswise center axis. The housing mounts guide vanes 11c in mesh with driving vanes 11d mounted on the rotor to define the duct within the housing. Compressed gaseous fluid is supplied to the throat of the housing from the output side of compressors 14 through pipes 16. The fluid, after expansion and utilization in the housing as previously described, is discharged through pipes 17a and 17 after flowing through the duct in radially outward direction, and returned to the inlet side of compressors 13, as has been described in connection with FIG. 1. The heat exchanger 18 is included for the purpose explained in connection with FIG. 1 in the return path from the housing to the inlet side of the compressors.

The vanes of the turbine including nuclear fuel should be visualized as shown and described in connection with FIGS. 9, 10 and 11. The nuclear fuel is preferably included in the stationary guide vanes. The reactor constituted by the fuel is of the critical fast reactor type.

The turbine drives the compressors 13 via transmissions 12 and electric generators 15 via transmissions 14. Transmissions 12 may be visualized as including shafts about which the rotor 11b rotates.

The radial flow, double-rotation or Ljungström type turbine, shown in FIGS. 3 and 4, comprises two rotor halves 19 and 20 supported on hollow shafts 21 and 22 respectively, extended into a stationary turbine housing 23. The shafts are journaled by bearings 26 and 27 respectively of conventional design, and sealed to the housing by suitable bushings 24 and 25 such as labyrinth bushings.

Each of the shafts should be visualized as being coupled to a compressor and an electric generator, as has been described in connection with FIG. 2 with respect to compressors 13, transmissions 14 and generators 15.

Each of the rotor halves mounts a plurality of radially spaced and axially extending vanes 28 and 29 respectively. The vanes of the two rotor halves are disposed to intermesh so that the vanes of each rotor half define guide vanes for the driving vanes of the other rotor half. As is evident, the vanes define a continuous tortuous path which leads from the rotational axis of the shafts radially outward to a discharge outlet 30 in the outer peripheral wall of the housing. All or some of the vanes of one or both rotor halves include nuclear fuel. The respective vanes may be arranged as shown in FIG. 11.

The operation of the turbine of FIGS. 3 and 4 by the release of nuclear energy to the gaseous fluid flowing through the duct between the vanes will be evident from the previous description. Starting of the turbine may also be effected as previously described.

Control of the release of nuclear energy may be effected by making one or both rotor halves axially displaceable in reference to each other. There is diagrammatically shown axial displacement of the left rotor half together with shaft 21 by means of a motor 31 coupled to shaft 21 by a suitable and conventional linkage 32.

Referring now to FIG. 5, the installation of this figure comprises a nuclear reactor turbine 60 similar to the turbine 1 of FIG. 1. However, the nuclear reactor turbine may also be visualized as a radial-flow turbine, as shown in FIG. 2, or a double-rotation flow turbine, as shown in FIGS. 3 and 4.

The turbine is connected in a closed circulation system including a heat exchanger or recuperator 61 of conventional design, a cooler 33 for cooling the action fluid if necessary, a compressor 34 of conventional design and a layer of fertile material placed outside the core of the nuclear reactor represented by the nuclear fuel or fissionable material incorporated in at least some of the vanes, as previously described. Such layer, which is commonly referred to as a blanket, is shown as comprising a high pressure part 35 and a low pressure part 36. The arrangement of the blanket will be more fully described in connection with FIGS. 7 and 8. Compressor 34 and an electric generator 37 are coupled to the turbine by a shaft 37a to be driven by the rotation of the rotor of the turbine. Starting of the turbine may be effected, as has been described in connection with FIG. 1.

The nuclear reactor turbine should be visualized as being of the critical fast reactor type. The nuclear fuel incorporated in at least some of the vanes of the turbine may be $U^{235}$ or Pu and the blanket may contain $U^{238}$ in the form of cylindrical rods.

As to the manner in which nuclear fuel is incorporated in the vanes, reference is made to FIGS. 9, 10 and 11 of the previous description.

The gaseous fluid used to operate the turbine may be nitrogen. This gas passes through parts 35 and 36 of the blanket before and after expansion in the turbine. The temperature of the gas is increased by the heat released in the blanket; the nuclear heat released in the blanket may be estimated to be about 10 percent of the total.

Figure 6:
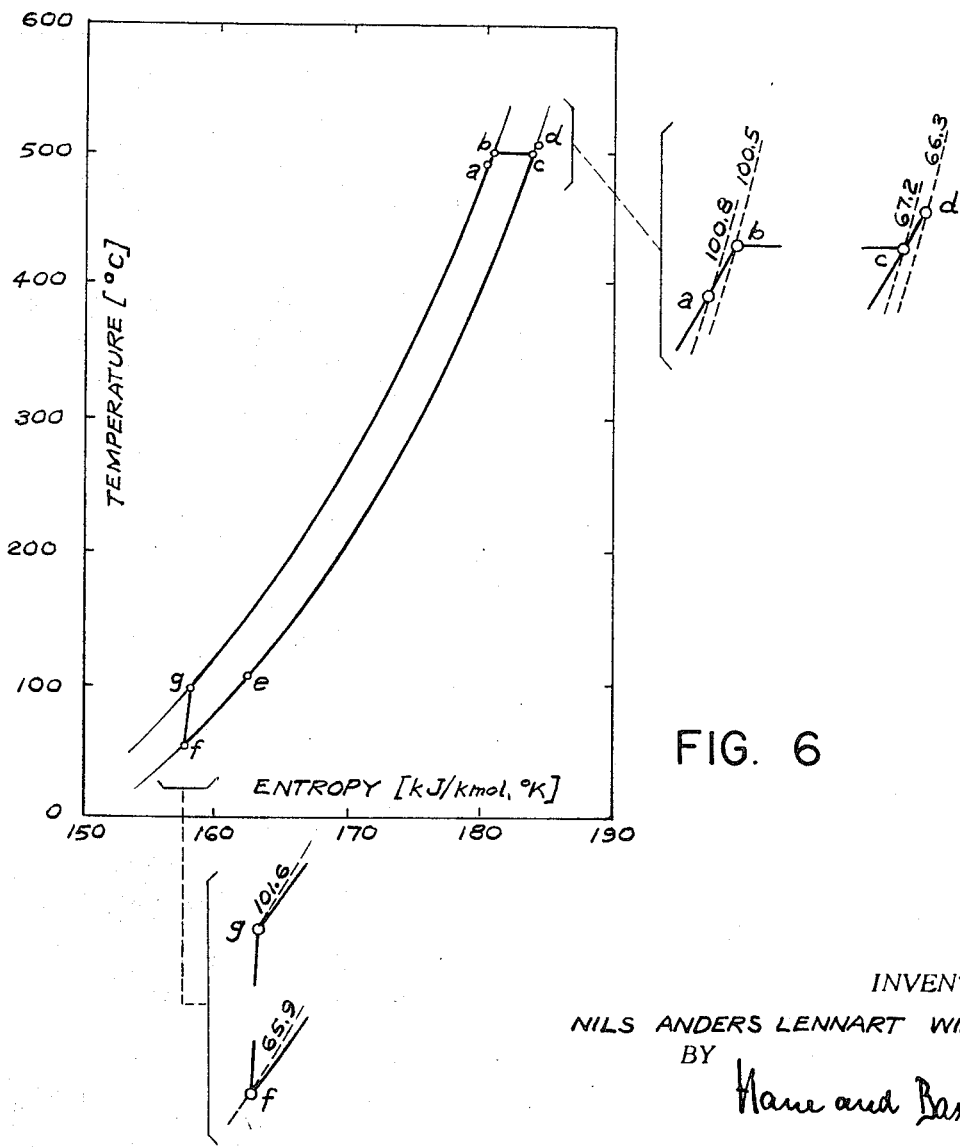
FIG. 6 is an entropy diagram.

Referring now to the entropy diagram of FIG. 6, gas may be fed to the high pressure part 35 of the blanket at a pressure of 100.8 bar and at a temperature of 494° C (point $a$). As it passes through this blanket part its pressure decreases to 100.5 bar and the temperature increases to 500° C (point $b$). The gas is then passed through the turbine 60 in which it is expanded to a pressure of 67.2 bar (point $c$), the temperature remaining constant during such expansion (isothermal). Finally, the gas is passed through the low pressure part 36 of the blanket whereby its temperature increases to 503° C at a pressure of 66.3 bar (point $d$).

In the heat exchanger or recuperator 61 the gas gives off heat to the colder high-pressure gas, thereby causing a temperature drop to 107° C (point $e$), and in cooler 33 the temperature and the pressure of the gas are further lowered to 50° C and 65.9 bar respectively (point $f$). The pressure of the gas is again raised in the compressor to 101.6 bar and the temperature to 99° C (point $g$), and after passing the heat exchanger or recuperator 61 the gas has again the pressure of 100.8 bar and a temperature of 494° C, that is, the gas pressure and temperature are returned to the values of point $a$.

As the scale of the entropy diagram is very small due to the large differences between the highest and the lowest pressure and temperature values, certain critical portions of the diagram are shown on an enlarged scale to facilitate analysis thereof.

Turning now to FIGS. 7 and 8, the nuclear reactor turbine as shown in these figures is of the radial-flow type. It should be visualized as being included in a closed circuit system of the kind described in connection with the previous exemplifications of the invention.

The turbine comprises a hollow shaft 38 which is journaled in bearings 39 of suitable and conventional design. The shaft is rotatable within a stationary housing 43, which is sealed to the shaft by bushings or seals 53 of suitable design, such as labyrinth seals. The housing is mounted on a base, diagrammatically indicated at 52 and is divided by radially disposed partition walls 65 66 into three communicating annular compartments 44, 45 and 46. Shaft 38 mounts for rotation therewith a generally disk-shaped support member 40 radially protruding within intermediate compartment 45. The support member has secured thereto a plurality of axially and symmetrically disposed driving vanes 41. These vanes intermesh with guide vanes 42 stationarily secured within compartment 45, preferably to partition walls 65 and 66, to define a continuous tortuous duct therebetween.

The nuclear fuel is incorporated in all or some of guide vanes 42, preferably in the manner described in connection with FIGS. 9 and 10.

The vanes 41 and 42 occupy only the radially inward portion of compartment 45, as is clearly shown in FIGS. 7 and 8. The radially outward part of the compartment and compartments 44 and 46 have mounted therein a plurality of neutron absorption rods 47, as it is diagrammatically indicated in the figures.

Gas is fed into the housing by inlet ducts 48 and 49 communicating with compartments 44 and 46 at the periphery thereof, and is discharged from the housing through ducts 50 and 51 communicating with intermediate compartment 45.

Neutron absorption rods 47 and the spaces in the three compartments other than the space occupied by the vanes constitute a blanket for the nuclear reactor formed by the nuclear fuel incorporated in the guide vanes. A composition of natural uranium oxide is a suitable material for rods 47 as is well known. However, rods 47 may also contain other nuclear fuel.

As is evident from an analysis of the figures, the gas fed into the housing through ducts 48 and 49 will first flow radially inward past rods 47 and it will then flow radially outward guided by the continuous tortuous duct defined by guide vanes 42 and driving vanes 41 toward and through outlets 50 and 51.

Careful calculations show that with the specific arrangements described in connection with FIGS. 5–11 the following operating data can be obtained by way of example:

| | |
|---|---|
| Thermal power generated in the reactor core, mw | 266 |
| Thermal power generated in the blanket elements, mw | 29 |
| Thermal power generated in toto, mw | 295 |
| Turbo-generator mechanical efficiency | 0.98 |
| Electric generator power output, mw | 104 |
| Heat withdrawn from cooler, mw | 189 |
| Total efficiency, defined by the expression Net work/$\eta$=Total heat added in reactor and blanket | 0.35 |
| Volume of gas circulating through the installation, kg./s | 3,170 |
| Total volume of reactor core, m³ | 1.83 |
| Nuclear fuel portion of reactor core, percent | 24 |
| Steel portion of reactor core, percent | 31 |
| Gas-filled portion of reactor core, percent | 45 |
| Total volume of blanket body, m³ | 40.6 |
| Nuclear fuel portion of blanket body, percent | 12 |
| Reactor core inner diameter, m | 1.51 |
| Reactor core outer diameter, m | 2.61 |
| Maximum stress in reactor steel rotational parts, kp./mm.² | 8.0 |

What is claimed is:

1. A method of converting nuclear energy to mechanical energy, said method comprising the steps of:
   providing a nuclear reactor turbine wherein the reactor is a fast critical reactor, said turbine including a plurality of meshing guide vanes and driving vanes, at least the driving vanes being rotatable, said guide vanes defining therebetween duct portions mutually in parallel and said driving vanes also defining therebetween duct portions mutually in parallel, the duct portions as defined by the guide vanes and the driving vanes being serially connected to form a continuous duct having a fluid inlet and a fluid outlet for a gaseous fluid flow therethrough and at least some of the vanes defining said duct portions having solid fissionable material incorporated therein for releasing nuclear energy from the fissionable material into the fluid flow through said continuous duct;
   directing a flow of a compressed gaseous fluid through said continuous duct;
   subjecting said fluid flow to a substantially isothermal expansion in at least some duct portions for transferring the released nuclear energy to the fluid flow;
   directing the expanded fluid flow upon the rotatable driving vanes to effect rotation thereof thereby converting the released nuclear energy to mechanical energy; and
   recompressing the expanded gaseous fluid by applying thereto part of the nuclear energy converted to mechanical energy, and returning the compressed fluid to the fluid inlet of said continuous duct.

2. A method of converting nuclear energy to mechanical energy, said method comprising the steps of:
   providing a nuclear reactor turbine wherein the reactor is a fast critical reactor, said turbine including a plurality of meshing guide vanes and driving vanes, at least the driving vanes being rotatable, said guide vanes defining therebetween duct portions mutually in parallel and said driving vanes also defining therebetween duct portions mutually in parallel, the duct portions as defined by the guide vanes and the driving vanes being serially connected to form a continuous duct having a fluid inlet and a fluid outlet for a gaseous fluid flow therethrough and at least some of the vanes defining said duct portions having solid fissionable material incorporated therein for releasing nuclear energy from the fissionable material into the fluid flow through said continuous duct;
   directing a flow of a compressed gaseous fluid through said continuous duct;
   subjecting said fluid flow to a substantially isothermal expansion in at least some duct portions for transferring the released nuclear energy to the fluid flow; and
   directing the expanded fluid flow upon the rotatable driving vanes to effect rotation thereof thereby converting the released nuclear energy to mechanical energy.

3. The method according to claim 17 wherein a flow of heavy water is directed through said continuous duct.

4. An installation for converting nuclear energy to mechanical energy, said installation comprising in combination:
   a nuclear reactor turbine wherein the reactor is a fast critical reactor, said turbine including a plurality of meshing guide vanes and driving vanes, at least the driving vanes being rotatably mounted, said guide vanes defining therebetween duct portions mutually connected in parallel and said driving vanes also defining therebetween duct portions mutually connected in parallel, said duct portions as defined by the guide vanes and the driving vanes being serially connected to define a continuous duct having a fluid inlet and a fluid outlet;
   solid fissionable material incorporated in at least some of said vanes as nuclear fuel for releasing nuclear energy into a gaseous fluid flow through said duct;
   compressor means for compressing a gaseous fluid flow; and
   conduit means connecting the output side of said compressor means to the inlet of the duct for feeding gaseous fluid contained in said conduit means under pressure into said duct, said duct including portions effecting a substantially isothermal expansion of the compressed fluid flow in the duct thereby transferring released nuclear energy to the fluid flow to effect rotation of the driving vanes.

5. The installation according to claim 4 wherein the fissionable material is incorporated in guide vanes, each of the guide vanes having the fissionable material incorporated therein comprising a stationary jacket and a rod made at least partly of a nuclear fuel and enclosed by the jacket, said rod being selectively retractable from the jacket for controlling the release of nuclear energy to the fluid in the duct by varying the position of the rod in the jacket.

6. The installation according to claim 4 wherein said turbine is an axial-flow turbine having a rotor mounting said driving vanes and a stationary housing mounting said guide vanes in intermeshing relationship with the driving vanes to define said duct, said gaseous fluid being admitted into the housing at one end of the housing and discharged therefrom at the other end.

7. The installation according to claim 4 wherein said turbine is a radial-flow turbine having a rotor mounting said driving vanes and a stationary housing mounting said guide means in intermeshing relationship with the drive vanes to define said duct, said gaseous fluid being admitted into the housing at about the radially inner end thereof and discharged at the radially outer end thereof.

8. The installation according to claim 4 wherein said turbine is a double-rotation, radial-flow turbine comprising a housing and two mutually rotatable rotor halves within the housing, each of said rotor halves mounting a plurality of vanes intermeshing with the vanes on the other rotor half, the vanes on one rotor half constituting guide vanes and the vanes on the other rotor half constituting driving vanes, the fluid inlet of the duct being at the rotational axis of the rotor halves and the fluid outlet at the outer periphery of said housing, at least one of the rotor halves mounting the vanes incorporating said fissionable material.

9. The installation according to claim 8 wherein the rotor half mounting the vanes including the fissionable material is axially displaceable in reference to the other rotor half for controlling the release of nuclear energy to the gaseous fluid in the duct.

10. The installation according to claim 4 wherein said nuclear fuel incorporating vanes constitute the core of a nuclear reactor, and wherein stationary blanket means surround said core thereby increasing the total nuclear energy release of the reactor.

11. The installation according to claim 4 wherein heat exchanger means are included in said conduit means between the outlet of the turbine duct and the input side of the compressor means.

12. The installation according to claim 4 wherein said nuclear reactor turbine comprises a stationary annular housing radially divided by partition walls into at least two axially juxtaposed compartments in communication with each other adjacent to the radially inner end thereof, a shaft coaxially extended through the housing sealed thereto, said shaft mounting within one of the compartments a radially protruding support extending through part of the radial length of said one compartment, the driving vanes extending in axial direction from said support and the intermeshing guide vanes extending axially from the partition walls defining said one compartment, neutron absorption rods disposed in the radially outer part of said one compartment and in the other compartment, the fluid inlet for said duct being located at a point of the radially outer end of said other compartment and the fluid outlet being located at the radially outer end of said one compartment at a point thereof substantially opposite to the location of the duct inlet thereby causing the compressed gaseous fluid to flow from the inlet through the compartments, past the rods therein and radially outward through said duct to the outlet, said neutron absorption rods and the compartments constituting a blanket means for the nuclear core formed by the fissionable material incorporated in at least some of the vanes.

13. The installation according to claim 4 wherein the vanes having incorporated therein the fissionable material are guide vanes, each comprise a jacket and a rod made at least partly of nuclear fuel and enclosed by the jacket, said rod being selectively retractable from the jacket for controlling the release of nuclear energy by the position of the rod in its jacket.

14. The installation according to claim 4 wherein said nuclear reactor turbine comprises a stationary annular housing radially divided by partition walls into at least two axially juxtaposed compartments in communication with each other adjacent to the radially inner end thereof, a shaft coaxially extended through the housing sealed thereto, said shaft mounting within one of the compartments a radially protruding support extending through part of the radial length of said one compartment, the driving vanes extending in axial direction from said support and the intermeshing guide vanes extending axially from the partition walls defining said one compartment, and nuclear fuel rods disposed in the radially outer part of said one compartment and in the other compartment, the fluid inlet for said duct being located at a point of the radially outer end of said one compartment at a point thereof substantially opposite to the location of the duct inlet thereby causing the compressed gaseous fluid to flow from the inlet through the compartments, past the rods therein and radially outward through said duct to the outlet.

* * * * *